United States Patent [19]

Johnson et al.

[11] 4,124,887

[45] Nov. 7, 1978

[54] REAL TIME COMPUTER CONTROL SYSTEM FOR AUTOMATIC MACHINES

[75] Inventors: Gary D. Johnson, Newark Valley; Michael M. Levie, Binghamton; Donald R. Freese, Binghamton; Robert W. Lee, Binghamton; Eldred H. Paufve, Windsor, all of N.Y.

[73] Assignee: Universal Instruments Corporation, Binghamton, N.Y.

[21] Appl. No.: 784,617

[22] Filed: Apr. 4, 1977

[51] Int. Cl.$^2$ .............................................. H04Q 9/00
[52] U.S. Cl. ............................. 364/107; 340/146.1 C; 340/147 P
[58] Field of Search ........ 340/147 LP, 147 R, 147 D, 340/147 SY, 147 P, 146.1 C; 235/151.11, 151.1; 364/107, 119, 200

[56] References Cited

U.S. PATENT DOCUMENTS

| | | | |
|---|---|---|---|
| 3,237,164 | 2/1966 | Evans | 340/147 P |
| 3,551,885 | 12/1970 | Henzel | 340/146.1 C |
| 3,735,351 | 5/1973 | Macheel | 340/146.1 C |
| 3,914,741 | 10/1975 | Bonser et al. | 340/146.1 C |
| 3,978,451 | 8/1976 | Ito et al. | 340/147 LP |
| 3,990,036 | 11/1976 | Savit | 340/147SY |
| 3,990,046 | 11/1976 | Katz et al. | 340/147 LP |

Primary Examiner—David H. Malzahn
Attorney, Agent, or Firm—Fidelman, Wolffe & Waldron

[57] ABSTRACT

A computer controls a plurality of satellite machines in real time via a single bus comprised of undedicated, continuous transmission lines terminated at both ends in matching impedances. Each machine coupled to the bus is addressed and commanded during every computer cycle, responding only to signals directed to its address. When a machine is not electrically powered the computer provides an internal signal; computer cycles are never interrupted; continuous control of all other machines is maintained. Any number and mixed types of machines may operate from the bus simultaneously. Machines may be added or removed from bus, and machine programs may be added, removed or modified without interrupting operation of the other machines. Automatic safety reset is provided for machine or computer failure.

34 Claims, 10 Drawing Figures

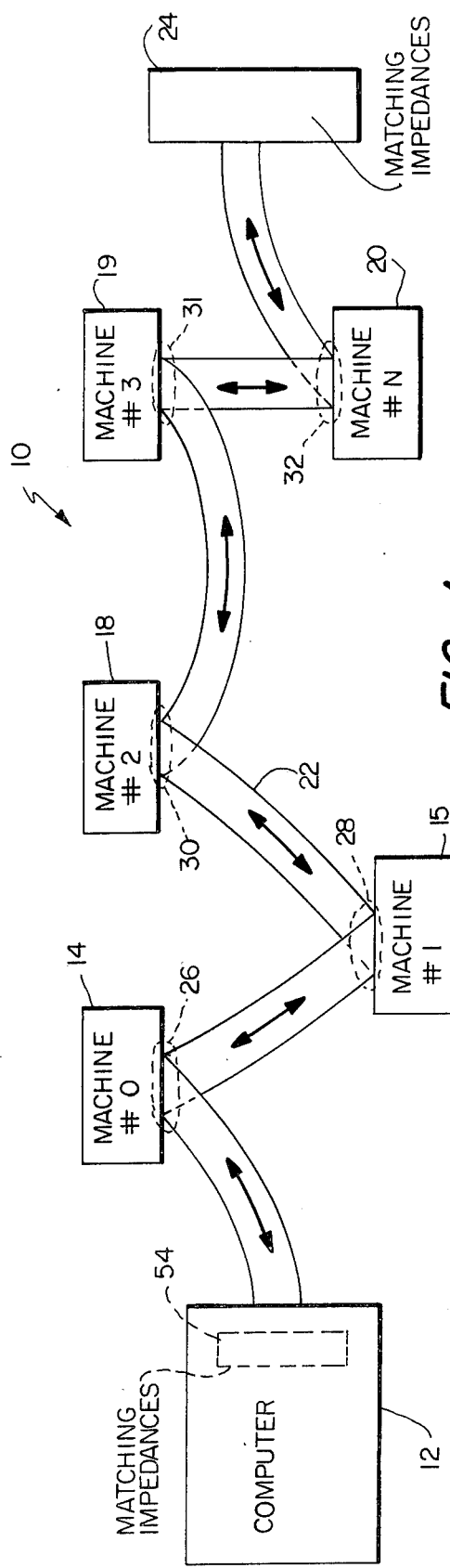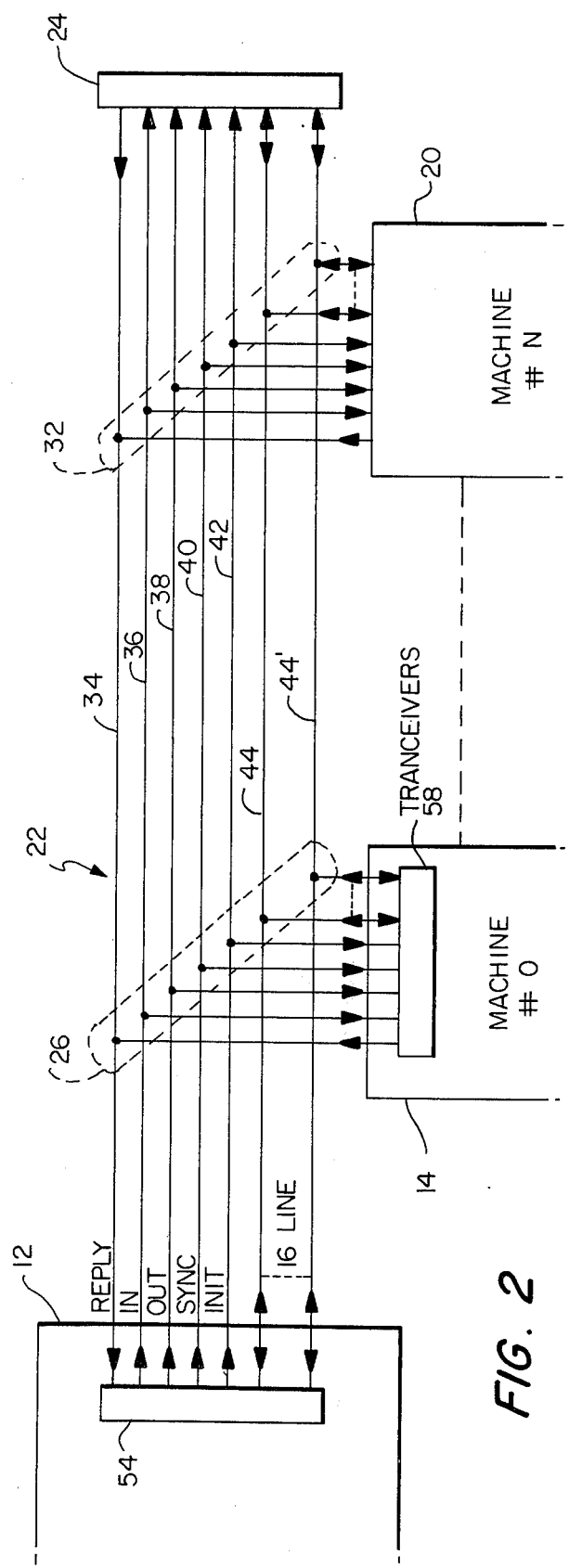

LOGIC

*OUTPUT SEQUENCE*

*INPUT SEQUENCE*

REAL TIME COMPUTER CONTROL SYSTEM FOR AUTOMATIC MACHINES

BACKGROUND OF THE INVENTION

The present invention relates generally to the control of machine operation by computer and more particularly to a system for controlling in real time a plurality of satellite automatic machines by a remotely located process control computer. The computer is connected electrically to all of the machines simultaneously by a common data bus.

Controlling the operation of individual machines automatically is well known in the art. Generally instructions for a particular operation or operational sequence of the machine are fed directly to the machine from an input device, e.g. a card or tape reader, located at the machine site. This method requires at each machine not only the input device which reads and decodes instructions from a prepared program of instructions but also storage at the machine of the desired program whether contained in cards, tape, magnetic memory, etc. U.S. Pat. No. 3,793,625 is an example of this type of system. Where the machine continuously and repetitively performs the same or a few similar tasks, e.g. a drill press, the programmed instructions are readily stored at the machine site. However, where a machine is suited to produce a wide variety of products e.g. a circuit board wiring machine capable of producing a multitude of wiring patterns as instructed, the number of programmed instructions which must be stored or provided at the machine site can be substantial. Also the mechanics of changing programs can require considerable operator skills, attention and program handling at the machine, with the contingent cost and risks of damage to the instructions, i.e. cards, tapes, etc. Additionally there is the initial cost and maintenance costs of providing independent input and data storage files at each machine.

Control concepts have also been directed toward the operation of a plurality of similar machines from instruction programs maintained in a single central memory and distributed to the machines by a central processing computer unit. U.S. Pat. No. 3,760,169, Interface System For Direct Numeric Control of Automatic Wiring Machines is an example of such a system. Therein when so requested by an individual machine, a process control computer retrieves blocks of instruction data from stored memory and outputs the instructions on a data highway, as it is called in the terminology of said patent.

The data highway provides a common path from computer to all machines with a parallel branch from the common bus extending to each machine via an independent interface unit. Individual control units, one associated with each machine, request data from the computer in a format which identifies the machine requesting service. The computer decodes the incoming request and outputs a data block from memory responsive to said request. At the same time the computer provides a ground line which enables reception of the data only at the machine which has requested data. The control unit reads a portion of the outputted data block to ascertain that the computer outputted data is valid for the machine and to allow the interface unit to accept data.

This system although using a plurality of common data highways is nevertheless complex in that it requires a control unit and an interface unit at each machine, as well as two common data highways, one between the computer and the interface units and another data highway between the computer and the control units. Further there are individual wiring lines dedicated to interconnecting (a) each machine to its associated interface unit, (b) each interface unit to its associated control unit, (c) each interface unit to the computer, and (d) each control unit to the computer. As configured the computer serves merely as a data retrieval and distribution control console. The machine itself is not computer controlled but is in fact controlled in its operations by the interface unit which controls the computer, stores data and feeds additional instruction steps to the machine as the machine performs and completes each of its electro-mechanical operations.

SUMMARY OF THE INVENTION

The control system of this invention includes a single, common, multi-conductor satellite bus which electrically connects the central processing unit of a computer to a plurality of individual machines which may be of different types. Programs for all operations performable by the machines are stored in the computer's memory and peripheral storage. The computer is programmed to continuously and repetitively output on the satellite bus address and data commands to the machines in ordered sequence. At each machine every outputted address is received and compared; each machine then accepts and responds only to those instructions which have been addressed to that specific machine. All other machines coupled to the satellite bus will neither accept nor respond to a signal addressed to another machine. During the cycle of instructions the computer, in effect, queries each machine whether it is active; when a machine is not operating, the computer, by a programmed subroutine, omits to output instructions which the inoperative machine is unable to utilize. Additionally, the computer sets an unpowered machine in a safe condition so that the machine will not perform run-away operations at the instant of power application. The cycle of instructions from the computer is repeated at timed intervals, e.g., in the order of 0.5 to 10 milliseconds. Time saved by omitting instructions otherwise to be addressed to an inoperative machine is available for other programs which share time and space in the common central processing unit and memory and for restructuring the stored programs.

An operator at each machine sets switches to identify each machine; and in an initial terminal dialog with the computer, an operator selects the program of operations to be performed by each machine. A single terminal, generally at the computer, serves this function. The computer reads out the selected programs from memory sources and incorporates them into its cycle of sequenced instructions.

The satellite bus is comprised of a plurality of transmission lines each terminated in a matching impedance so as to control reflection of signals on the lines, thereby enabling rapid, real-time control of a plurality of machine operations over extended distances. No conductor in the satellite bus is directed exclusively to any one machine coupled to the bus. Each conductor serves every machine. Additionally, long distance transmission is facilitated by use of differential lines for each signal in conjunction with differential input line signal receivers that have high common mode noise rejection and do not rely on ground reference between computer and machines.

Failure of the computer to provide adequate voltage level signal outputs and other computer malfunctions cause all machines to cease operation eliminating the hazard to operator and equipment which might otherwise exist when an uncontrolled machine operates. Similarly an improperly operating machine automatically ceases operation and isolates itself electronically from the system thereby enabling other machines to continue normal functioning.

The pattern of operation of any machine may be terminated or changed, and machines may be added to or removed from the bus, at any time without interrupting the operation of the other machines coupled to the satellite bus.

OBJECTS OF THE INVENTION

An object of the present invention is to provide a simple control system whereby a central computer controls the operation of a plurality of satellite machines on a real time basis.

Another object of the present invention is to permit concurrent operation of a plurality of different types of satellite machines.

A further object of the present invention is to permit concurrent operation of a plurality of the same type of satellite machines while individual machines perform different programs.

Still another object of the present invention is to permit a change or termination in the program of individual machines without interruption in operation of other machines in the system.

A still further object of the present invention is to provide computer control, over extended distances, of remotely located machines while maintaining real time operation.

Yet another object of the present invention is to increase the commonality of functional elements in the system and reduce the amount of peripheral equipment required at each individual machine.

Another object of the present invention is to provide a single data bus which provides two way communication between computer and machines.

A further object of the present invention is to provide asynchronous computer operation thereby maintaining real time control over a plurality of machines regardless of the individual machine's response time.

A still further object of the present invention is to provide automatic isolation from the system of any individual machine which malfunctions.

And another further object of the present invention is to provide automatic shut down of all machines should the computer malfunction.

Yet another object of the present invention is to provide a machine control system whereby an unpowered machine is rendered safe in response for the time of power application.

Other objects, advantages, and novel features of the present invention will become apparent from the following detailed description of the invention when considered in conjunction with the accompanying drawing in which:

FIG. 1 is a functional block diagram of an overall control system of this invention;

FIG. 2 is partial semi-schematic block diagram of the control system of FIG. 1.

FIG. 6($b$) illustrates the timing cycle for an INPUT command sequence in the system of FIG. 1.

DESCRIPTION OF THE INVENTION

Principles of Operation

Figure 3:
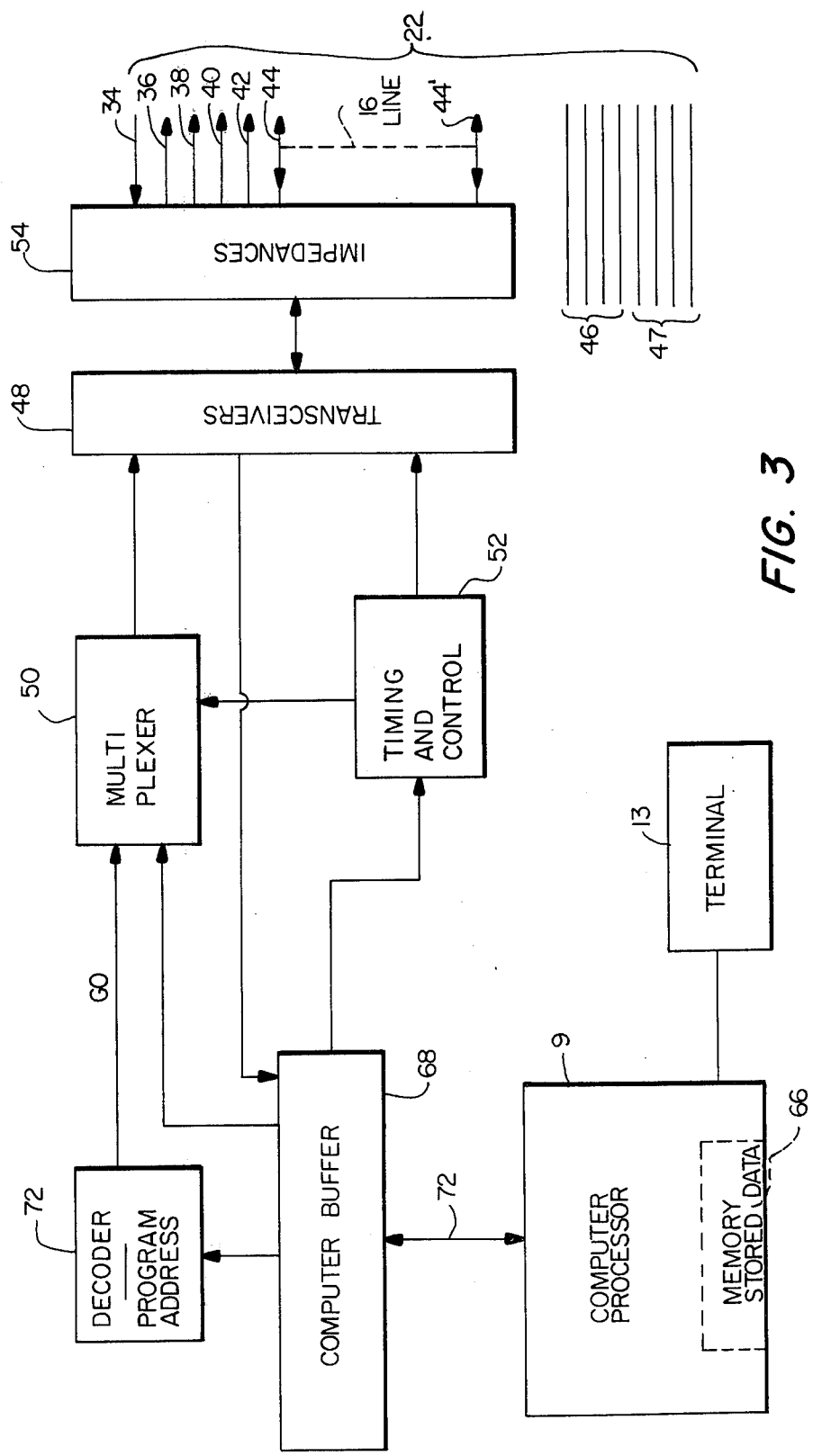
FIG. 3 is a partial functional block diagram of circuits for the computer of FIG. 1.

FIG. 1, which illustrates in simplified format an embodiment of the control system 10 of this invention indicates a process control computer 12, a plurality of satellite machines 14, 15, 18, 19, 20 which are controlled by the computer 12, and a multi-wire satellite bus 22 which extends continuously from the computer 12 to the matching impedance terminator 24 at the far end of the satellite bus 22. The satellite bus 22 is of extended length and is routed to the proximity of each machine where an individual coupling 26, 28, 30, 31, 32 (indicated by dotted lines) electronically links each machine (14, 15, 18, 19, 20 respectively) to the satellite bus 22 without breaking the continuity of conductors within the satellite bus 22. Because the connection to the bus 22 is made directly and by high impedance circuitry, the distance between the bus 22 and the individual machines is not critical in terms of wavelengths as it would be in coupling to a transmission line using stub connectors sized to the design frequency of the transmission line. Thus, as explained below, the coupling means of this invention permit operation of a practically unlimited number of machines (as indicated by machine numbers 0, 1, 2, 3 ... N) from a single computer 12 and satellite bus 22.

The scattered arrangement of machines in FIG. 1 is merely to illustrate that the satellite bus 22 is routed to the machines as they stand in a facility and no special physically ordered arrangement of machines is required.

As will be disclosed more fully hereinafter, each conductor within the bus 22 is electrically linked to a corresponding conductor in the coupling which connects directly to a machine. Thus, for example, a satellite bus 22 having 50 electrical conductors within it will link respectively to 50 electrical conductors in the coupling connected to each machine.

The system 10 of this invention is described as it is applicable to a computer and logic networks wherein machine address identification signals and machine data signals between computer and machine are embodied in words of 16 bits. Sixteen line pairs of the satellite bus 22 are used to transmit these sixteen bit signals in parallel bidirectional operation. These sixteen data and address lines, including 32 conductors, each pair of which carry one bit of the above-mentioned 16 bit words are represented in FIG. 2 as contained within two lines 44, 44'. It should be understood that different word lengths may be employed in alternative embodiments of the system with the number of lines modified to sufficiently carry the signals.

Also there are five control signal lines; namely, REPLY 34, IN 36, OUT 38, Sync 40 and INIT 42, which each consist of two conductors. For the sake of simplification in the drawing, FIG. 2, each pair of signal conductors is represented by only one drawn line 34, 36, 38, 40, 42.

The lines in the satellite bus 22 are driven by transmitters in the transceivers 48, 58 which operate in three states of output. When outputting a logical one signal onto a transmission line, the transmitter output drives to a high voltage, e.g. + 5 volts D.C.; when outputting a logical zero, the transmitter output drives to a low voltage, e.g., 0 volts. However, when a signal is to be received at a transceiver, the transmitter is placed in a condition to present a high input impedance on the line of the incoming signal so as not to load down the source.

The transmitted signals on the two conductor transmission lines are differential signals, that is, the signal on one line is a compliment of the other e.g. + 5 volts on one line and 0 volts on the other line.

Also for clarity in reading the drawing (FIG. 2), only two machines; namely the first machine, number 0, identified by reference number 14, and the last, or Nth machine, identified by reference number 20, are shown coupled to the satellite bus 22. It should be understood that any number of machines, dependent upon the speed and storage capacity of the computer 12, may be operated from the same bus 22; the bus 22 is not the limiting factor.

In an embodiment of the system 10 of this invention a computer by Digital Equipment Corp., PDP-11 Series with 16,384 words of memory substantially, simultaneously controlled sixteen sequencer machines used on automatic component insertion equipment for production of printed circuit boards. The sequencer machines are manufactured by Universal Instruments Corporation, Binghamton, N.Y.

Furthermore in FIG. 2, the conductors in couplings 26, 32 between machines #0 and #N (14, 20 respectively) and the satellite bus 22 are indicated and referenced for simplicity in the same single-line drawing convention as lines in the satellite bus 22, as discussed above. FIG. 3 illustrates that the satellite bus 22 includes in addition to the 21 twin conductor lines described above, eight single conductor lines 46, 47 which are discussed more fully hereinafter. Thus for a system using 16 bit words the satellite bus includes 50 conductors consisting of 16 two-conductor address and data lines 44, 44' five two-conductor signal lines 34, 36, 38, 40, 42 and eight single conductor lines 46, 47. Such a 50 conductor satellite bus in the form of a flat ribbon cable has performed satisfactorily; such materials are commercially available along with coupling strips.

It should be noted that all conductors in the satellite bus 22 extend unbroken between terminator 54 and terminator 24 even though the bus may follow a random course to the vicinity of each machine as indicated in FIG. 1. No conductor in the satellite bus is dedicated to the service of a single machine; each conductor in the bus 22 serves every machine which is coupled to the bus. The far end terminator 24 may be physically attached to the last, Nth, machine.

In directing the operation of an active machine, the computer 12 outputs an address instruction from its memory 66 (FIG. 3). The address instruction is directed to the transmitter portion of the transceiver bank 48 by the multiplexer 50 which is set by the program address decoder unit 72 in a state to pass signals from the computer processor 9 to the transceivers 48. The address signal, comprised of a 16 bit word, is transmitted in parallel operation over the sixteen line address-data bus 44, 44' which is included in the satellite bus 22, e.g., a flat ribbon cable of fifty conductors, as discussed above. Each address-data line, i.e., a pair of conductors, is driven by an independently associated transmitter in the transceiver bank 48 and each data line is terminated at said associated transmitter by a proper matching impedance 54 for the line. Thus, the numbers 48 and 54 of FIG. 3 are each representative of a plurality of transmitter-receivers and matching impedances respectively.

The 16 bit address instruction word includes 7 bits, e.g., the seven most significant bits, which in an octalbinary code represents a three-digit decimal number from 000 to 177. The 16 bit address instruction word is received at the program address decoder 72 where those seven most significant bits are decoded. When the 7 bits represent the address of the machine satellite system 10 then a GO signal 74 (FIGS. 6a and 6b) is sent from the decoder 72 to the multiplexer 50 which permits the multiplexer 50 to pass the entire 16 bits in parallel to sixteen parallel transmitters in the transceivers 48. All signals entering or leaving the computer processor 9 do so via the buffer 68 which isolates the computer processor 9 from the remainder of the system. Thus, the 7 bit number, three digit decimal, determines for the computer 12 that the programmed instruction is part of the satellite machine control system 10 rather than part of another program which may share time on the computer 12.

Another 3 bits of the 16 bit address instruction coming from the computer identify the number of the machine i.e., the machine address, for which the transmission is intended. Eight machines from 000 to 111 binary, corresponding to 0 to 7 decimal, can be exclusively identified by arrangement of the three bits. Another bit of the sixteen bit address instruction is reserved to indicate if more than eight machines are coupled to the satellite bus 22. With this reserved bit the number (N) of machines which can be simultaneously controlled is increased to sixteen. Obviously, an additional bit, if reserved for this address purpose, will increase the number (N) of machines which can operate simultaneously in the system 10 of this invention to 32, and so forth.

Another four bits of the 16 bit address instruction from the computer are used as a machine function enabling signal. These four bits, in 16 possible combinations, when decoded at the addressed machine will enable one set of machine function circuits, out of 16 available circuit sets, making that one selected circuit set ready to receive, accept and respond to subsequent data commands from the computer 12 as explained hereinafter.

The computer transmitters in the transceivers 48 drive the 16 lines 44, 44' of the satellite bus 22 and the aforesaid sixteen bit address signal 76 (FIGS. 6a and 6b) propogates in parallel along the bus 22 to every machine coupled to the bus 22. At each machine an individual differential input receiver in the transceivers 58, one associated with each coupled line, receives and amplifies the signal. Very little energy is absorbed from the bus 22 at each machine, so that the bulk of the energy travels the full length of the satellite bus 22 and is dissipated in the matching impedance of the terminator 24 thereby minimizing reflections on the lines. Thus each pair of lines in the bus 22 is a transmission line terminated at both ends by its matching impedance and suited for two-way signal transmission. The number 24 has been used to represent a plurality of matching impedances, one for each transmission line.

The 16 bit address instruction is received at all of the coupled machines and seven bits, namely, the three machine address bits and four machine function enabling bits, as aforesaid, are presented to the input of the machine logic circuits 62 (FIG. 4) by way of the input-output buffer 64 and transceivers 58. The remainder of the sixteen bits in the address command are not used by the addressed machine, but were used to control the multiplexer 50 as described above.

After sufficient time has elapsed to permit the address command to travel the entire length of the bus 22, and become stable on the lines, the computer strobes (FIGS. 6a and 6b) a pulse 78 on the SYNC line 40 which is received at each machine. This SYNC pulse 78 allows the three address bits and four function bits to enter and enable the machine logic circuits 62 and allows the four machine function bits to be received and decoded if, and only if, the transmitted machine address portion of the instruction i.e., three bits, from the computer 12 matches the address of a given machine. All other machines which have received the same 16 bit signal from the satellite bus 22 but which do not match the transmitted address information reject the transmitted information entirely and are unaffected by that particular transmission from the computer.

The four machine function bits included in the 16 bit address command which are decoded within the machine logic circuits 62 enable a single decoder output in the addressed machine. This response is also latched so that an enabled condition is retained until the following instruction from the computer 12 is received and performed by the addressed machine in the manner well known in the art of automatic machine control.

Figure 6A:
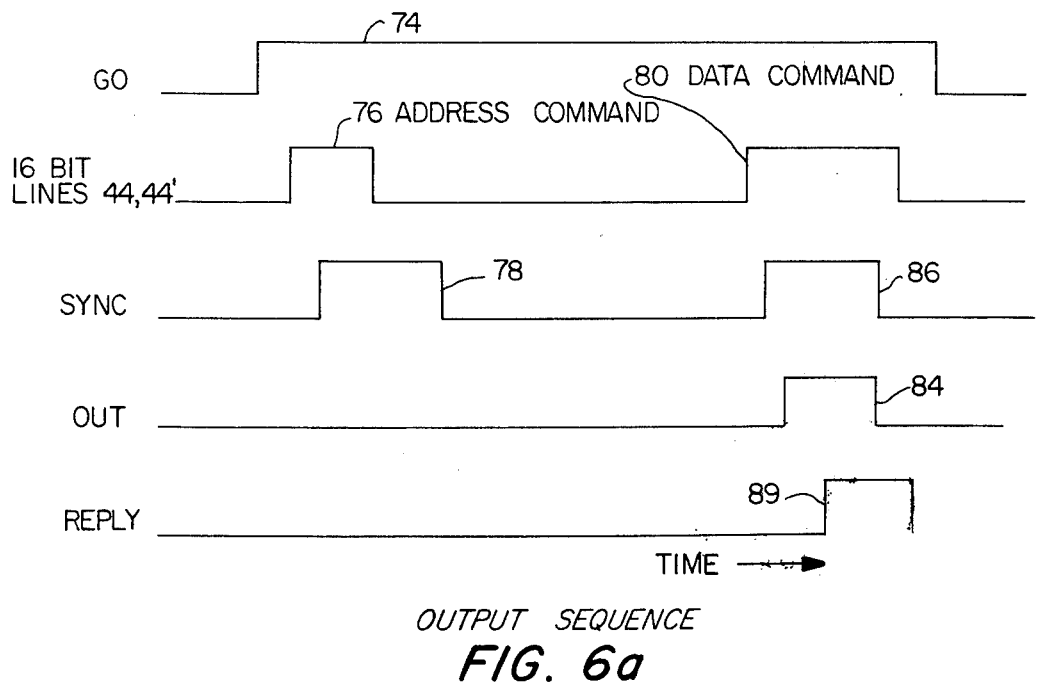
FIG. 6($a$) illustrates the timing cycle for an OUTPUT command sequence in the system of FIG. 1.
Figure 6B:
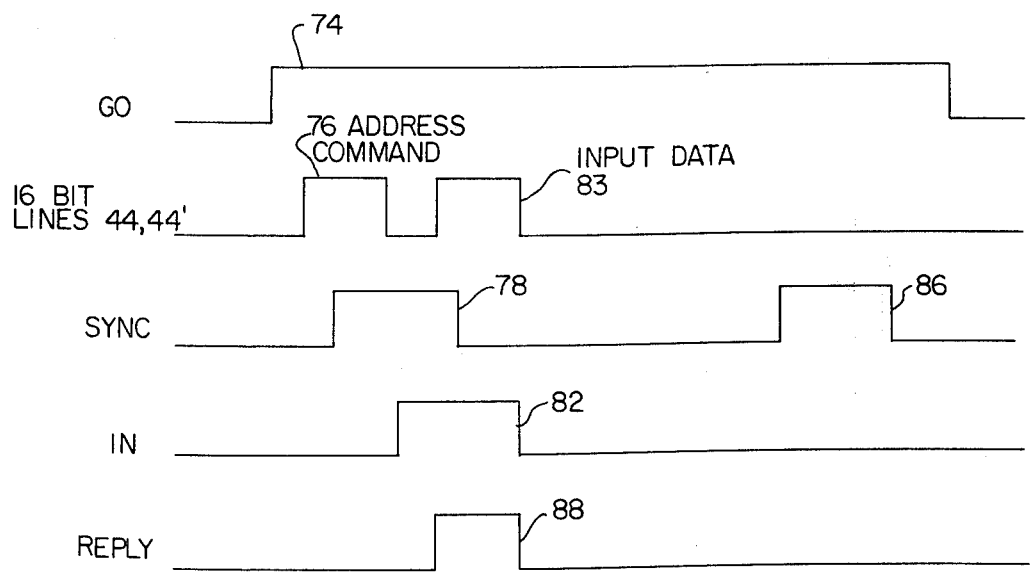

After a small delay following transmission of the 16 bit address signal, the computer sends a pulse signal on either the OUT line 38 or the IN line 36 depending respectively upon whether the next 16 bit signal from the computer is a functional instruction (Out) to the machine (FIG. 6a) or a request that the machine send a status report back to (In) the computer 12 (FIG. 6b).

'OUT' COMMAND

Substantially concurrent with an OUT pulse 84, (FIG. 6a), the multiplexer 50 switches to the data bank memory sources 66 so that functional machine data instructions required for the proper sequence of machine operation is read out of memory and applied to the transceivers 48 via the buffer 68, and multiplexer 50. The buffer 68 serves to isolate the internal computer bus 72 from the external system. The functional data instruction 80 is propagated down the satellite bus 22 in 16 bit parallel format, and is accepted on the occurrence of the OUT pulse 84 by the one addressed machine which is latched and enabled while all other machines coupled to the satellite bus 22 remain locked out and unaffected by the transmission.

The mechanisms by which the addressed machine provides an electro-mechanical response to the sixteen bit data instruction are known in the art, are not a novel part of this invention, and for this reason are not given a detailed description herein. The data instruction may be directed to the accomplishment of many tasks, including simultaneous tasks, for examples, in an electronic circuit board wiring machine, the data instruction may cause the work table to move along one of its axes or cause a component to be inserted in the board, or the data instruction may simply cause a panel light on the machine to be illuminated. In any event, an OUT data instruction 80 is responded to only by those functional circuits of the selected machine which were enabled, as discussed above, by the four bits transmitted as part of the preceding address instruction 76. As explained hereinafter, each of the sixteen data bits can initiate an individual task.

On the one machine having the matched address, the aforementioned strobe signal 84 on the OUT line 38 will cause the machine logic circuits 62 to transmit a pulse 89 back to the computer on the REPLY line 34. Reception of the REPLY pulse 89 at the computer 12 indicates that the addressed machine has in fact accepted the data 80 when the OUT signal 84 was transmitted.

'IN' COMMAND

When a 16 bit address instruction signal 76 is followed with a pulse 82 on the IN line 36, (FIG. 6b) this indicates via the machine logic circuits 62 that the addressed machine will transmit status data 83, i.e. INPUT, to the computer 12. As before the machine pulses a response 88 on the REPLY line 34 which indicates that data is valid at the addressed machine. The IN pulse at the addressed machine causes the receivers at that machine to turn off and the transmitters to turn on. The IN signal at the computer 12 places the computer transmitters in the transceivers 48, in a high impedance receive condition together with the transmitters at all non-addressed machines, so as not to present an electrical load on the satellite bus 22. The addressed machine propagates its data 83 to the computer via the 16 lines 44,44' of the bus 22. The multiplexer 50 is enabled to pass the input from the machine via the line impedances 54 and transceivers 48 into the computer memory 66 where it is available for use as the computer's programmed sequence specifies. Data inputs 83 from machine to computer are generally status reports conveying in the sixteen bit transmission such information as the program requires including, for example, rate of motion or position of the work bed of an electronic circuit board wiring machine. Status monitoring by Input cycles will continue by programmed subroutines until the desired pre-programmed condition of the machine is achieved. No new OUTPUT instructions will be addressed to a machine until that machine has completed its last commanded OUTPUT instruction as the status reports indicate.

After transmission of the address and data instruction whether the instruction directed an INPUT from the machine or an OUTPUT, the computer 12 proceeds to the next step of its prepared software program. The computer 12 is never interrupted in its program. All planned machine operations are included in the program. In a fixed time cycle the computer services all the machines coupled to the satellite bus 22. The machines are generally serviced in the inverted order (FIG. 7) of their machine number, i.e. address, but may be serviced in any sequence established by the computer program. The next command from the computer 12 could be to the very same machine or to any other machine on the system, thus slower functioning machines could be addressed at wider-timed intervals within a program cycle than rapidly responding machines. The next address instruction could be associated with either a following INPUT command or an OUTPUT command as the program sequence dictates.

When a sequence of commands from the computer 12 is completed in the fixed time cycle, another entire sequence of commands is repeated, again in the fixed time cycle. Thus every machine is addressed at least once during the fixed time cycle. Time within the fixed time cycle which is not needed to control machines in the satellite system of this invention is available for other tasks, e.g., performing other programs sharing time on the computer, preparation and outputting management data, inputting new machine programs to memory, all without interruption of the sequence or timing of on-going satellite machine-related operations. In an embodiment of this invention wherein a single central processing unit controlled the operation of a plurality of automatic circuit board wiring machines on a 50-wire satellite bus extending uninterrupted for a distance in the range of several hundred feet, the fixed time cycle is in the order of ten milliseconds. Thus every machine on the satellite bus is addressed in the order of one hundred times in every second thereby providing real time control.

LOGIC

Response to address commands 76 from the computer 12 is more fully explained with reference to FIG. 5, where three bits representing the machine address are pulsed into the machine logic circuits 62 in parallel on three lines 90, 92, 94 and are presented for comparison at the address comparator 96. The incoming address signals are compared against a pattern of voltages in the comparator 96 determined by the settings of three parallel bit switches 100. Each machine on the line has its own unique address, i.e. a machine number established by one of the eight possible combination of settings of the three switches 100.

When the first SYNC signal 78 arrives from the computer 12 via the SYNC line 98, a pulse is produced at the comparator output 102 if and only if the three bit address signals match the voltage patterns produced by the settings on the address switches 100. Thus only one machine address can match and respond to an address instruction 76 from the computer 12.

The pulse output 102 from the comparator 96 makes high the output of the OR gate 104, which when ANDED with the SYNC signal 78 in the succeeding gate 106 enables one input of each of four parallel AND gates 108, 109, 110, 111. This enabled condition produced by the gates 104, 106 is latched and remains after the address input bits and the SYNC pulse 78 are ended.

Concurrently, with the above described processing of the three address bits, four bits representing the machine function portion of the address instruction 76 from the computer 12 are pulsed into the machine logic circuits 62 in parallel on four lines 114, 115, 118, 120. These four bits are received at the latch 122 and upon occurrence of the aforesaid strobing SYNC signal 78 on line 98 produces a matching pattern of signals at the outputs of the latch 122. These latch outputs are maintained after the functional input bits 76 and the SYNC pulse 78 are ended. A four bit incoming signal allows for sixteen combinations, each represented by a unique binary number. If the most significant digit of the four bits, on input line 120, is high then one latch ouput 124 enables the upper decoder 126; (as seen in FIG. 5). If the most significant digit of the four bits, on input line 120, is low, then another latch output 130 is high and the lower decoder 128 is enabled. The most significant digit input 124 from the latch 122 reaches the decoder 126 via the two-input AND gate 110 whose other input is only high when the address signal bits and machine address match in the comparator 96 and upon the occurrence of the SYNC signal 78 on the SYNC line 98 as aforesaid. Similarly, the lower decoder 128 is activated via an AND gate 111. Other outputs pass in parallel directly from latch 122 to the decoders 126, 128. Each decoder 126, 128 has eight output lines; only one output line goes high for a given combination of the four incoming signals. Thus in the addressed machine, each unique four bit functional signal produces a unique, single enabling output from decoders 126, 128 and the machine logic circuit 62. In FIG. 5 this single output line is shown by number 130. This enabled condition of a single output 130 of the machine logic circuit is maintained until the latch 122 and the latched gates 104, 106 are cleared by the trailing edge of the second SYNC pulse 86.

In summary, the addressed machine has in effect recognized the sixteen bit address signal 76 transmitted down the satellite bus 22 and directed to that specific machine. The addressed machine's logic circuits have enabled and latched a single output 130 of the 16 available output lines.

In accordance with its program, the computer transmits a second 16 bit signal, e.g. the data command, 80, along the satellite bus 22. The signal is received at all machines, however, only the machine which has a latched output 130 resulting from the preceding address command, 76, discussed above, is able to utilize the data command. Because the addressed machine is already latched none of the transmitted bits are required for address identification and the entire sixteen bits are available to cause performance of machine tasks.

The enabling signal 130 from the function control logic 62 enables one input to the two-input AND gate 132 in the output circuits 134 of the addressed machine. Arrival of a signal 84 from the computer 12 on the OUT signal line 38 at the second input of the AND gate 132, via a gate 131 causes the AND gate output 136 to go high. The high output 136 of the AND gate 132 enables sixteen separate parallel, output latches 138. The concurrent presence of the sixteen bit data signal, one bit presented at the input 140 of each latch 138, produces an output 142 at each latch 138 which corresponds to the data bit input. It is the coincident arrival of the data signal 80 and the OUT pulse 84 which produces the response at the output latch 138. The latch outputs 142 are used to cause machine performance, e.g. light a panel lamp, translate a work table, advance a tool, etc., in the manner known in the art of operating automatic machinery. With a 16 bit data signal and 16 latches 138, sixteen machine operations can be performed at once.

Figure 4:
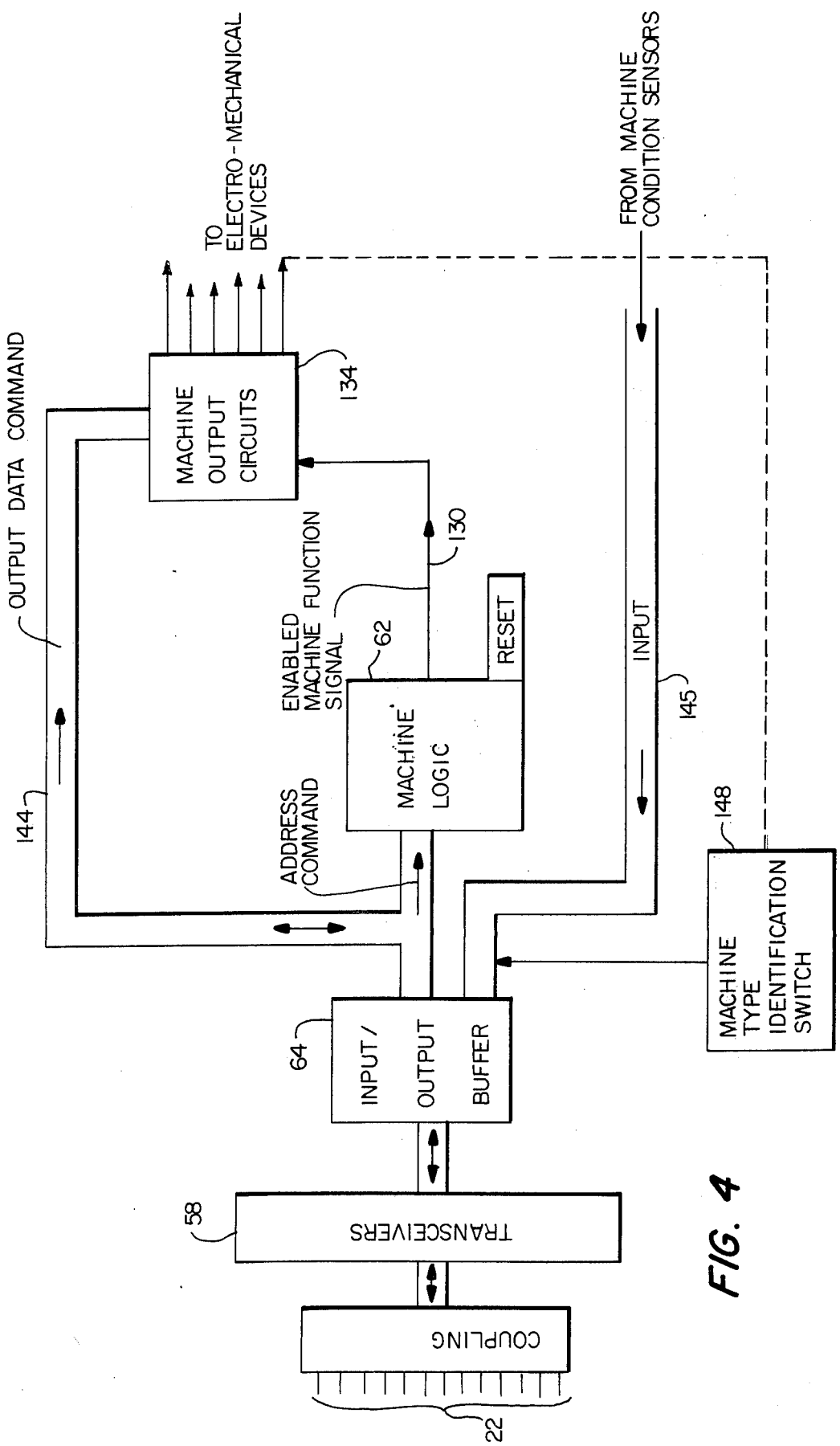
FIG. 4 is a partial functional block diagram of circuits for a machine of FIG. 1.
Figure 5:
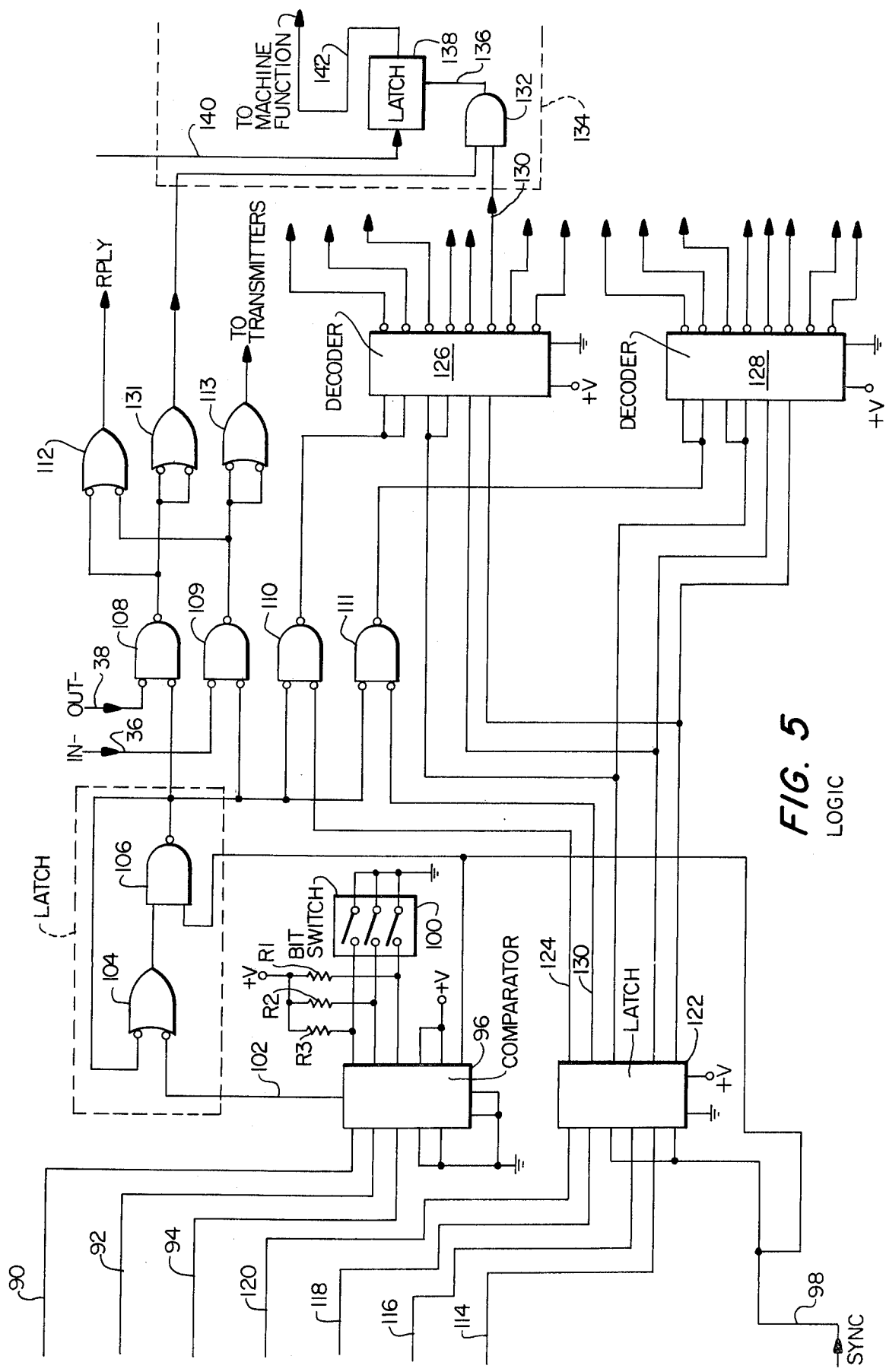
FIG. 5 is a partial, simplified schematic of the logic circuit of FIG. 4.

It should be understood that for the sake of clarity in FIG. 5 only one latch 138 of sixteen parallel latches is illustrated. The AND gate 132 enables all sixteen latches simultaneously to receive a separate data signal. This sixteen bit signal moves from the buffer 64 to the output circuits 134 directly via the bypass 144 as seen in FIG. 4.

The OUT signal 84 also causes the output of the enabled AND gate 108 to go high which causes the OR gate 112 to go high as aforesaid and a REPLY signal 89 to be transmitted to the computer 12 via the REPLY signal line 34. When this REPLY signal is received at the computer interface it indicates that the addressed machine has accepted the output data command. A second pulse 86 at its trailing edge, received on the SYNC line 98 unlatches the latched devices 122, 104, 106 of the machine address and function control logic 62 thus clearing all circuits in readiness for the next address signal. The GO signal 74 from the decoder 72 which, as stated above, enables the computer 12 to service the machine satellite system 10 of this invention, terminates shortly after the second SYNC pulse 86 occurring during commanding of one machine in the sequence of machines. Thus the computer is free to perform tasks other than direct control of machines.

When the computer 12 requests a status report, INPUT, from a machine, the first 16 bit transmission 76 is an address command similar to the address command as discussed above. This signal is followed shortly thereafter by an outgoing pulse 82 on the IN line 36. The IN pulse 82 causes the sixteen data transmitters in the computer transceivers 48 to turn off, presenting a high impedance on the data lines, and causes the receivers in the computer transceivers 48 to turn on. At the addressed machine the IN pulse 82 causes the transmitters to go on and the receivers to go off via series gates 109, 113. In this condition, 16 bits of information 83 are transmitted over the 16 data channels 44, 44' from the addressed machine to the computer 12. The signals originate from sensors within the machine itself and indicate machine conditions, e.g., a panel light is ON; the position coordinates of the work bed, tool position, etc. These inputs 83 from the machines go from the addressed machine to the satellite bus 22 via the bypass 145, input/output buffer 64, transmitters in the machine transceivers 58, and the coupling. The signals travel the satellite bus 22 from machine to computer 12 where the receivers in the transceivers 48 produce corresponding signals which enter the computer memory 66 via the buffer 68. The computer utilizes this new input data as the sequenced program requires in determining the next commands to the machine.

When the above mentioned IN signal 82 arrives at the machine logic unit 62 on the IN line 36, it makes high the output of the already-enabled AND gate 109. The high output of this gate 109 causes a REPLY signal 88 to be sent to the computer 12 via the OR gate 112 and the REPLY signal line 34, and also causes the activation of the machine transmitters, as described above, via the second OR gate 113.

The satellite bus terminator 54 provides at the computer 12 a matching impedance for each of the 16 data lines 44, 44' so that the energy transmitted from the machine is received at the computer interface without uncontrolled reflections on the lines. Thus, the satellite bus data lines 44, 44', being continuous from end to end, with each line terminated at both ends in its matching impedance 24, 54, are bidirectional transmission lines. The signal lines 36, 38, 40, 42 are undirectional transmission lines terminated in matching impedance 24 at the end away from the computer. The REPLY lines 34 are unidirectional and are terminated at the computer 12 and far end in matching impedances 54, 24 (respectively).

It should be noted that signals sent from a machine to the computer 12 are also presented at the interface of every other machine via their coupling to the satellite bus 22, but their receivers are OFF during the IN signals from the computer 12, and no response is produced at the unaddressed machines.

FIGS. 4 and 5 represent the electronic functions of the circuits of one machine suited for use in the satellite system 10 of this invention. Each machine, O to N, coupled to the satellite bus 22 is provided with similar circuitry, however, only one computer 12, one computer structure (FIG. 3) and one satellite bus 22 control simultaneously all machines coupled to the bus.

FIGS. 6a,b illustrate the timing relationship between address, data and control signals. In the text presented above, it has been convenient for more logically disclosing the system to describe an OUT command signal first and then an IN command signal. In a preferred embodiment of this invention an OUT signal is preceded by an IN signal as explained more fully hereinafter.

OPERATION

Figure 7:
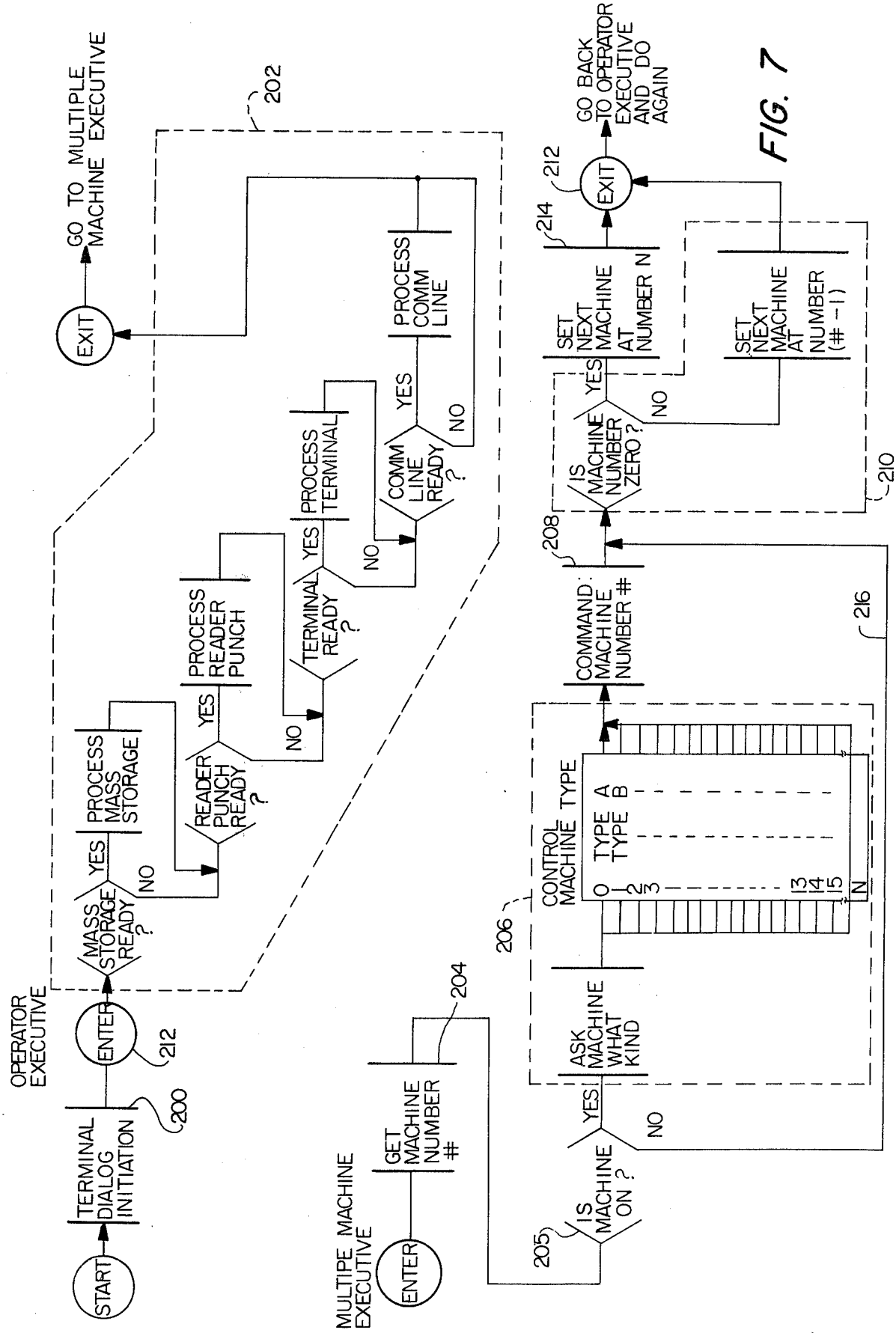
FIG. 7 is a simplified functional flow diagram for operation of the system of FIG. 1.

FIG. 7 illustrates diagrammatically the steps of operation. In operation of the control system 10 of this invention, an operator conducts an initial terminal dialog 200 with the computer 12. This is accomplished, for example, at the computer site using a keyboard terminal 13. For the sake of an example it will be assumed that at one installation eight machines related to the insertion of components in a circuit board assembly are permanently coupled to the satellite bus 22. Prior to the terminal dialog 200 the three bit address switch 100 is preset at each machine so that each machine has a unique address, i.e. 0 to 7. This setting is performed only once for a machine. Also, at each machine a seven bit machine-type switch 148 (FIG. 4) is preset which defines for the computer 12 the type of machine which is coupled to the satellite bus 22, for examples, a transistor inserter machine or a DIP inserter machine. Some of the seven switches further define the machine type, e.g. three-axis or rotary table. Then, electrical power is applied to machines which are to be operated for this production run. It is necessary that all machines coupled to the bus 22 be powered only at the initial terminal dialogue 200 time, if special features are described, i.e., but switch option, board reject.

When the computer 12 is powered up, the computer 12 queries the operator via the terminal display 13. Answering questions one at a time the operator furnishes inputs to the computer, e.g. the electrical supply frequency for the machines, i.e. 50 or 60 HZ, and whether the program and machines operate on metric linear units or inches. The computer 12 requests identification of the peripherals attached to it for inputting data, e.g. high speed punch, high speed reader, supplemental memory storage units.

After the answers are furnished, the computer is READY and requests that the Operator ENTER PATTERN. The operator, at the terminal, enters by coded identification the pattern to be performed by each machine for component insertion and identifies each machine by its address number. The computer retrieves selected pattern data from memory and establishes a sequence of commands which includes every command necessary to complete the entered patterns. The program establishes the sequence in which machines will be commanded. As previously stated, consecutive commands may go to any machine; however, for this example it will be assumed that the machines are to be commanded in a reverse order, i.e. machine #7 first and machine #0 last. The cycle of commands is repeated at intervals, e.g., 0.5 to 10.0 milliseconds; thus, each machine will be addressed at least once in each time cycle. Note that within the fixed cycle of time, other tasks unrelated to the machines, and other related operations such as inputting new patterns, may be programmed for performance. However, for simplicity of description, the sequence of operations will be described here as if only commands directly to the circuit board wiring machines of this example are to be processed.

The external dialog with the computer is completed for all machines by a single operator at a single terminal 13. At each machine an operator loads into each machine blank circuit boards to be assembled and components to be inserted. Machines not in use need not be attended. Assume for this example that machines #1, 2, 6 and 7 have power on and will be operated; machines 0, 3, 4 and 5 are not powered. When a machine is ready, the operator at the machine presses the START control at the machine.

The computer commences 212 an automatic internal dialog to identify the first machine which is to be commanded, i.e. #7, as soon as the computer is powered up. However, in a preliminary sequence of steps 202, the computer determines which input devices, e.g., reader punch, are waiting to furnish data to the computer and for a timed period during each cycle the computer processes data from those devices in turn. Thus, new patterns to be performed by a machine may be inserted during any cycle.

Then the computer 12 sends out its first instructions, namely, an address signal 76,204 directed to machine #7 which has power on (FIGS. 6, 7). As previously explained, only machine #7 will be enabled by the address signal 76,204. The computer immediately follows with an IN signal 82, i.e. the computer requests information from machine #7. The information first requested and transmitted from machine #7 comes from the abovedescribed seven bit switch 148 at the machine which tells the computer what type of machine is machine #7. Also, included in the transmission 83 to the computer is a single bit by whose presence is indicated that power is on at machine #7. These steps are generally indicated in FIG. 7 by the numbers 205,206.

The computer next 208 sends out another address command 76 to machine #7 typically followed by an OUT data signal 84. Machine #7 is thus enabled and then directed 80 to perform a programmed task, e.g. move the workbed, insert a component, as described above. The computer then sends yet another address signal 76 to machine #7 and follows it with an IN command 82, requesting that machine #7 send back a status report 83, e.g. the distance of work bed movement, bed velocity, insertion completed, etc. As previously explained, all address 76 and data 80 commands and input data 83 travel the sixteen lines 44, 44' in the satellite bus 22 and are synchronized to the aforementioned control signals, e.g. IN, OUT, SYNC, REPLY as indicated in FIGS. 6a and 6b. The computer is ready to command the next machine.

At this point in the computer program, it is determined that the last-serviced machine was #7. The program next prepares 210 to address machine #6 and loops back 212 to repeat the internal dialog 202 before sending signals 204 addressed to machine #6. If the last addressed machine is determined to be machine #0, then the next machine to be addressed 214 will be machine #7 again. As the cycle repeats, a subsequent step in the operation of each machine will be ordered and status will be monitored in accordance with the computer program of patterns. It is noteworthy that on every cycle, e.g. 10 milliseconds (a) there is an opportunity to input new patterns and remove or change old patterns; (b) the type of each machine is re-identified prior to any operational command to that machine; (c) the machine indicates by the presence or absence of one bit on the bus 22 whether or not it is powered on; thereby, it is possible to power up additional machines, e.g. machine #5, or turn off any machine, e.g. machine #2, at any time and its active presence or absence will be recognized by the computer on the very next cycle, that is, in 10 milliseconds or less; (d) each powered machine is commanded and its status is monitored.

A special condition exists when a machine is not turned on, i.e. without electrical power, or there are missing machines, e.g. only six coupled machines, whereas the system is configured by the three bit address switches to accomodate eight machines. In the example above this condition will first affect the sequence when machine #5, which is not powered, is addressed and is commanded to provide an identification input to the computer 12. As stated above, a high condition of one bit of the input data 83 from the machine suffices to inform the computer that the machine is on. Absence of the bit in the signal indicates that the machine is off. The difficulty arises in that a machine which is off cannot transmit a signal to convey this status information. In a conventional system when the computer fails to receive a required and anticipated signal the system traps out; operations stop until an operator determines and corrects the difficulty.

In the system 10 of this invention when an addressed machine is off, or not physically connected, and the return signal is lacking, the computer, after a fixed time delay during which no signal is received from the machine, generates its own internal signal which (a) prevents the system from trapping out and allows the cycle shortly thereafter to continue to the next machine, i.e. #4; (b) sets the servo circuits in the addressed machine (#5) which is powered off to a safe condition such that when power is applied to said machine there will be no uncontrolled, sudden operation or movements of the machine (e.g. the work bed) which could be harmful to the machine and its operator, and (c) bypasses 216 (FIG. 7) the identification and command steps 206, 208 which would go to the addressed machine if it were in fact powered on. Thus, unnecessary time is not devoted during the 10 millisecond cycle to machines which are not powered on.

Figure 9:
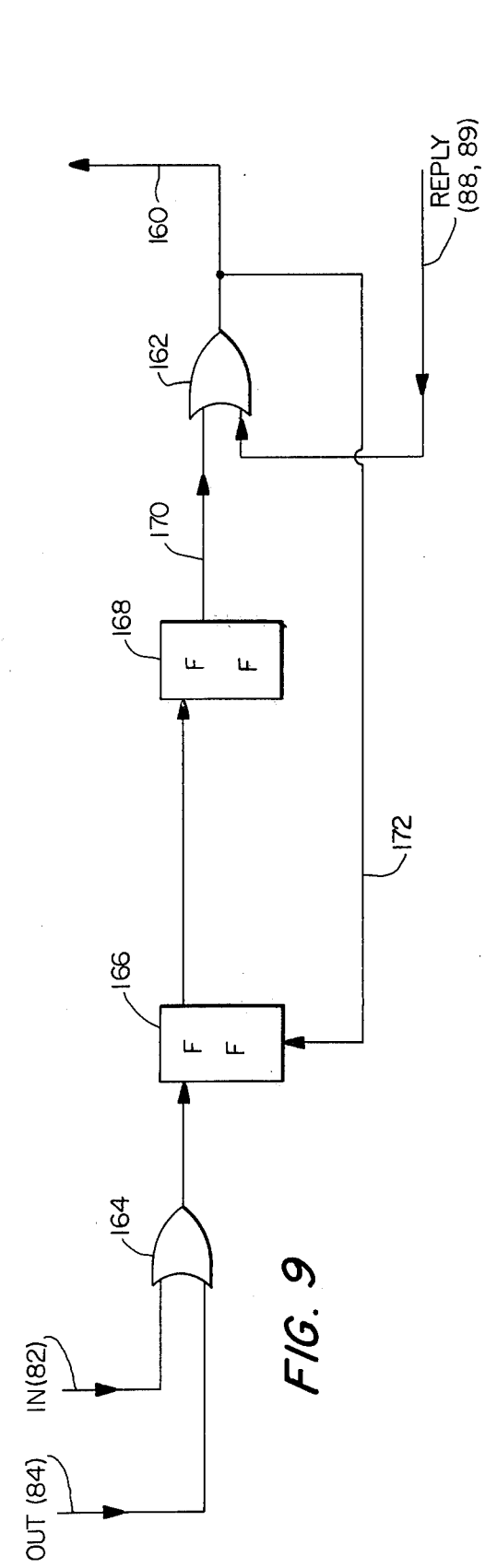
FIG. 9 is a functional diagram of a circuit for response when a machine is not powered.

FIG. 9 is a functional diagram of a pulse circuit located at the computer 12 in an embodiment of the system 10 of this invention which performs satisfactory, wherein in normal power-on operation the REPLY signal 88, 89 from the addressed machine, as aforesaid, cause the output 160 of the OR gate 162 to change state. This output 160 is used in a manner (not shown) which allows the computer 12 to continue to perform its program. Either the IN signal 82 or the OUT signal 84 from the computer, via a second OR gate 164, on a command from the computer 12 actuate a one-shot flip-flop 166. As FIG. 6 illustrates the IN and OUT signals 82, 84 precede the REPLY signals 88, 89 from the machine. The flip-flop 166 produces an output pulse having a duration in the order of one microsecond. A second flip-flop 168, whose output line 170 is normally low, goes high when the one-shot flip-flop 166 goes low. The output 170 of the second flip-flop 168 is ORd in the aforesaid gate 162. Therefore an output 160 is present at gate 162 to enable the computer 12 to continue its program whether or not a REPLY signal is received from the addressed machine. If the machine is not powered, no REPLY is received, but the IN 82 or OUT 84 signal enable the computer to continue. When the machine is powered, the returning REPLY signal enables the computer and also resets 172 the one-shot flip-flop 166.

Another special condition exists when a set of operations at a machine have been completed, i.e. the circuit board is wired in accordance with the pattern. Then the machine is automatically commanded by the computer program to a PARK condition, wherein although the machine is still powered on it will not be commanded by the computer to perform additional tasks. This allows the operator to remove the completed circuit board and insert another unwired board, or to change components and boards for subsequent operation wiring a new pattern which may be inputted to the computer as described above. Also, the machine operator can manually place the machine in a PARK condition any time that he wishes, for example, to inspect the work in process, correct an error, or determine why the machine has ceased performance. It should be noted that failure to complete a task, e.g. completely insert a resistor, is indicated by the INPUT status report. No new task is commanded to that machine until the prior task is complete. Thus, the operator will observe a machine which has ceased to perform; the operator responds by putting the machine in the PARK condition and seeking out the cause of this failure to perform.

The PARK condition connotes a fixed condition of the machine, e.g. the work table moves to a predetermined position in all controllable axes so that the operator has easy access to the work. Because the machine is still powered on, the full cycle of FIG. 7 continues and the status of the machine, e.g. work table position, is monitored at each cycle and commands are given by the computer to maintain that desired, stable physical PARK position as long as the machine is powered in the PARK condition. Thus, the machine's condition is always known and maintained and operation can resume from a known reference as soon as the operator again presses the START control.

It should also be noted (FIG. 7) that all other powered machines continue to operate as before, uninterrupted, whenever any machines are turned off or place in PARK.

Another feature of the system 10 of this invention provides for reset of the logic circuits at each machine should the computer lose power. The condition of the computer is sensed by a D.C. reference voltage, e.g. 5 volts, which is always present in the computer when the computer is on. This reference voltage is also always made present at the machine via a single conductor in the satellite bus 22. Thus, when the computer is on, the reference voltage is provided via the bus 22 to all machines; when the computer is off absence of this reference voltage resets all of the machine circuitry, i.e. no circuits remain latched, so that no uncontrolled operations and movements can occur at any of the machines.

All the machines are similarly reset when the computer reference voltage rises above or falls below the prescribed reference level by an amount exceeding an allowable tolerance level, thereby indicating a computer malfunction. In a 50 conductor bus 22, as described above, four lines 46 (FIG. 3) are available and used redundantly to provide the reference voltage from the computer at the machines. However, one line will suffice for this purpose.

Each machine, when powered, provides its own internal DC reference voltage, e.g. 5 volts, having the same magnitude and polarity as the reference voltage from the computer. These machine and computer voltages are compared at the machine and should the machine voltage diminish below or rise above an allowable tolerance level, indicating the potential for machine malfunction, then the reset circuits at the deficient machine are actuated to isolate that machine from responding to further computer commands and to place it in the unlatched condition which prevents instantaneous uncontrolled performance when proper power levels are restored.

The reset circuitry is live at each machine if either the computer or machine is powered on and the machine is placed in a safe condition if either the machine or computer circuits malfunction.

Figure 8:
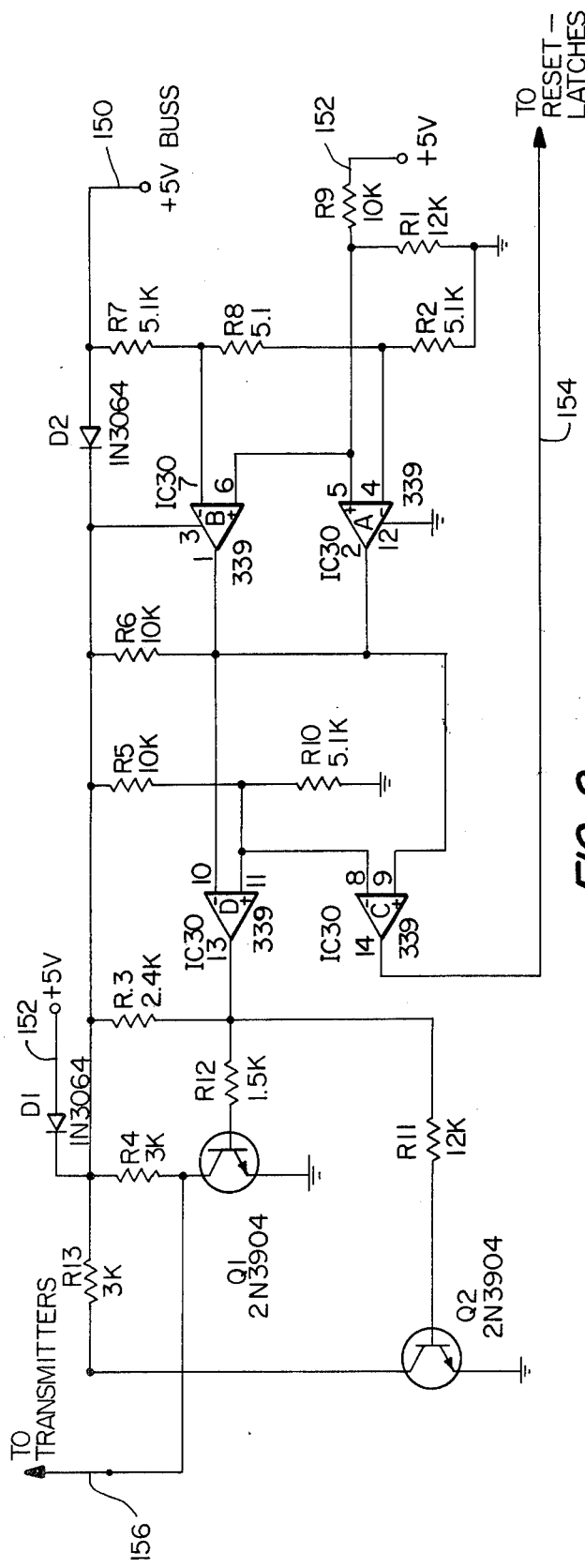
FIG. 8 is the schematic of a reset circuit for the system of FIG. 1.

FIG. 8 is a reset circuit located at each machine in an embodiment of the system 10 of this invention which performs satisfactorily, wherein the reference voltage 150, i.e. 5 volts DC, from the computer 12 via a line 46 in the satellite bus 22 is compared to the machine generated voltage 152, i.e. 5 volts DC. Should either voltage source fail or vary excessively from the prescribed level, as described above, then the reset signal on the line 154 is provided to the machine logic circuits. Another signal, output 156 from the reset circuit (FIG. 8), simultaneously with the reset signal on the line 154, feeds to the transceivers 58 at the machine and sets the transmitters within to present a high impedance to the satellite bus 22. Thus, when a machine circuit malfunction causes machine reset, the transmitters of that neutralized machine will not load down the transmission lines of the satellite bus 22. Other machines coupled to the bus continue to perform as before.

The other four single conductors 47 in the 50-conductor satellite bus 22 are used redundantly to provide a common ground between the machines and the computer; one ground line would suffice. This ground line provides a common reference for the voltage measurements which control automatic reset operations, as described above, and is used in the differential two-line transmission and reception of data over the satellite bus 22.

The two conductor signal line 42 indicated as INIT (FIG. 2) allows the operator to simultaneously reset all machines coupled to the system 10 by actuation of a single control located at the computer 12. It is not a novel part of this invention and needs no further disclosure herein.

REAL TIME OPERATION

Each transmission line in the satellite bus 22 is terminated at its far end in its matching impedance terminator 24, i.e. each two conductor line is matched with its matching impedance. Energy which has not been received and absorbed at a machine, travels the full length of the satellite bus 22 and is dissipated in the matching impedance of the terminator 24 thereby minimizing reflections on the lines. Each two-way transmission line is also terminated at the computer end by its matching impedance. Elimination of line reflections keeps the lines free of extraneous echo signals which would interact with and cause confusion with true signals. Without these matching impedances a significant delay would be required between transmission of valid signals in order to permit decay of signal echoes on the line. Thus, a more rapid sequence of signal transmission which enhances real time control of machines is made possible by the use of the impedance matched transmission lines.

Additionally, when transmission lines terminated in the characteristic impedance of the line are used, the signal strength is uniform along the entire line and a machine, and any number of machines, may be coupled at any point along the line. When the transmission line is terminated in a badly mismatched condition, i.e. the terminator impedance is significantly different from the characteristic impedance, then a high level of reflection exists. In this condition the signal strength varies everywhere along the length of the transmission line and such a line is useless for coupling for the purpose of machine control.

However, as is well known in the art, a matched transmission line draws more power from the transmitting source than does a mismatched line. Where the driving power of the transmitters is limited, some degree of mismatching of the line is a suitable compromise to prevent overload of these transmitting devices. An embodiment of the system 10 has preformed satisfactorily when load impedance exceeded the characteristic impedance of the line, causing a degree of mismatching with line reflections of up to 40 percent of the transmitted voltage. It should be noted in FIGS. 6a and 6b that the synchronizing pulses 78,84 are delayed somewhat after initiation of the commands 76,80 such that the command signal echoes have stabilized on the bus 22, i.e. the signals are valid, before the synchronizing pulses strobe the commands into the latches, and comparators, etc., of the circuitry as explained above.

The system of this invention is real time, not only in the sense that the computer controls at very short, rapid intervals, e.g. in the order of one hundred times per second per machine in an embodiment, but also the computer controls, by command and monitoring, as the machine operates, giving out commands at the instant when action or monitoring of the machine is required. Each and every function at each and every machine is controlled when it has to be controlled. In the prior art, e.g. U.S. Pat. No. 3,760,169, the reverse is true; it is the machine which controls the computer. The machine requests and the computer responds by delivering blocks of data which are stored at the machine. The machine then performs in many steps without any feedback to the computer or computer control until another large block of data is to be delivered. Thus there is no real time relationship between the computers activities and those of the machine.

What is claimed is:

1. A system for machine control for simultaneously controlling the operation in real time of a plurality of electrically powered machines comprising:
    a plurality of electrically powered machines; each of said machines including means for receiving, operating and reporting status in response to electrical commands from a computer, said machines not containing stored data to control machine operation;
    a computer having access to stored data for commanding the operation of each of said plurality of machines, said commands outputted in a sequence in accordance with the program of said computer, said commands occurring in cycles of short time duration, each of said cycles including a separate command directed to each of said plurality of machines;
    an undedicated electrical bus extending from said computer and transmitting said outputted commands and said status reports;
    coupling means for electrically coupling each of said machines to said bus;
    transmitter means at said computer for outputting said commands onto said bus, said bus carrying said commands from said computer to said plurality of machines via said bus and said coupling means;
    transmitter means at each of said plurality of machines for outputting data signals from said machines onto said bus, said data being inputted to said computer via said bus;
    receiving means at said computer for receiving signals from said bus;
    means at each one of said plurality of machines for receiving, comparing and responding to commands on said bus addressed to that one of said plurality of machines, and for receiving, comparing and not responding to commands on said bus not addressed to that one machine,
    whereby said single bus provides two-way communication between said computer and said machines, and said computer continuously commands performance and receives data from every one of said machines individually during every one of said cycles.

2. The system for machine control of claim 1 wherein said plurality of machines includes machines of different types, said different types performing different machine functions.

3. The system for machine control of claim 1 wherein said means at said computer for outputting and receiving signals include:
    multiplexer means, said multiplexer means, during separate timed intervals passing separately: address commands from said computer to said bus via said transmitter means; machine function data commands from said computer to said bus via said transmitter means; and status data from said machines via said bus to storage in said computer; and timing and control means whereby said transmitter, receiver and multiplexer means are synchronized.

4. The system for machine control of claim 1 wherein said bus comprises a plurality of parallel, continuous transmission lines including matching impedance terminations.

5. The system for machine control of claim 4 wherein said data signals are in binary format, each of said parallel two-way transmission lines carrying simultaneously in parallel format a single bit of said binary data.

6. The system for machine control of claim 1 wherein said undedicated bus includes a transmission line terminated at the computer end in an impedance selectively matched to the characteristic impedance of said transmission line, said transmission line being terminated at the other end remote from said computer in an impedance selectively matched to the characteristic impedance of said transmission line, whereby: signal echoes in said transmission line are limited; faster signal sequencing is facilitated; each machine is coupled to said transmission line at any location along said transmission line; and any number of said machines may be simultaneously coupled to said transmission line.

7. The system for machine control of claim 6 wherein said transmission line is continuous between said impedances with no conductor within said transmission line interrupted or directed exclusively to any one of said machines.

8. The system for machine control of claim 7 wherein said transmission line is comprised of two conductors spaced apart and signals transmitted on said transmission line are differential signals, and said receivers are differential input line receivers, whereby data is transmitted over long distances unaffected by electrical noise on said conductors.

9. The system for machine control of claim 1 wherein said means for receiving, comparing and responding include machine address identification means and machine type identification means.

10. The system for machine control of claim 9 wherein said computer in said cycle outputs commands via said bus to one of said plurality of coupled machines ordering said addressed machine to identify its type, and said addressed machine, when powered, recognizes said commands via said machine address identification means and said addressed machine transmits to said computer via said bus the condition of its machine type identification means, whereby said computer in each said cycle receives data to identify the type of said addressed and powered machine.

11. The system of machine control of claim 10 wherein said machines include means for outputting a power signal, and said computer includes means for detecting said power signal and adjusting said sequence of commands, and wherein said transmission from said addressed and powered machine to said cmputer further includes said power-signal indicating that said addressed machine is electrically powered, the non-arrival of said power-signal at said computer means for detecting said power signal indicating that said addressed machine is not electrically powered, whereby commands to said unpowered machine are omitted from said sequence of commands in said cycles.

12. A system for machine control for simultaneously controlling the operation of a plurality of electrically powered machines comprising:

a plurality of electrically powered machines, each of said machines including means for receiving, operating and reporting status in response to electrical commands for a computer;

a computer having access to stored data for commanding the operation of each of said plurality of machines;

an electrical bus extending from said computer and transmitting said outputted command and said status reports;

coupling means for electrically coupling each of said machines to said bus;

transmitter means at said computer for outputting said commands onto said bus, said bus carrying said commands from said computer to said plurality of machines via said bus and said coupling means;

transmitter means at each of said plurality of machines for outputting data from said machine onto said bus, said data being inputted to said computer via said bus; and receiving means at said computer for receiving signals from said bus;

whereby said single bus provides two-way communication between said computer and said machines, and said computer commands performance and receives data from said machines.

13. The system for machine control of claim 12 wherein said computer transmitter means are in said high impedance state when said machine transmitter means are outputting to said bus, whereby said outputting transmitter means are not unnecessarily loaded.

14. The system for machine control of claim 12 wherein said machine transmitter means are in said high impedance state when said computer transmitter means are outputting to said bus, whereby said outputting transmitter means are not unnecessarily loaded.

15. A system for machine control for controlling the operation of electrically powered machines, comprising:

said electrically powered machines adapted to receive and operate in response to electrical commands from a computer, a computer having access to stored data for commanding the operation of said machines, said commands outputted in cycles in accordance with the program of said computer, said cycles including commands addressed to one of said plurality of machines;

an electrical transmission bus extending from said computer and transmitting said outputted commands;

coupling means for electrically coupling said machines to said transmission bus;

transmitter means at said computer for outputting said commands onto said transmission bus, said transmission bus carrying said commands from said computer to said machines via said transmission bus and said coupling means;

receiving means at said computer for receiving signals from said transmission bus;

means at each of said machines for receiving and responding to commands on said bus addressed to that particular machine, said means for responding including means for resetting said addressed machine;

wherein said means for responding are reset in an addressed but not electrically powered machine, said reset commanded by said computer via said bus, so that unpowered machines are set into a condition producing no uncontrolled instantaneous machine response upon application of power to said machine, whereby hazards to said machine and machine operators are avoided.

16. A system for machine control for simultaneously controlling the operation of a plurality of electrically powered machines comprising:

a plurality of electrically powered machines, said machines including function circuits for controlling machine performance;

a computer connected to each of said plurality of machines by a common transmission bus, said bus including a computer reference voltage line whereby a computer reference voltage of prescribed value is present at each of said coupled machines when said computer is adequately powered; and functioning properly;

individual machine voltage means within each machine, said voltage means outputting a machine voltage of prescribed value when said machine is adequately powered; and functioning properly;

reset means within each machine, said computer reference voltage and said machine voltage being inputted separately to said reset means, said reset means setting said machine function circuits in every machine into a condition producing no machine performance when said computer reference voltage deviates beyond an allowable value from said prescribed computer reference value, whereby all machines coupled to said bus are set into a condition producing no performance when said computer malfunctions or is inoperative.

17. A system for machine control for simultaneously controlling the operation of a plurality of electrically powered machines comprising:
- a plurality of electrically powered machines, said machines including function circuits for controlling machine performance;
- a computer connected to each of said plurality of machines by a common transmission bus, said bus including a computer reference voltage line whereby a computer reference voltage of prescribed value is present at each of said coupled machines when said computer is adequately powered; and functioning properly;
- individual machine voltage means within each machine, said voltage means outputting a machine voltage of prescribed value when said machine is powered;
- reset means within each machine, said computer reference voltage and said machine voltage inputted separately to said reset means, said reset means setting said machine function circuits in each machine into a condition producing no machine performance when said machine voltage deviates beyond an allowable value from said prescribed machine voltage value, whereby an individual machine coupled to said bus having an excessively deviant machine voltage value is set into a condition producing no performance, and a machine having an allowable machine voltage value continues to respond to commands from said computer.

18. The system for machine control of claim 17 wherein said reset means within said machine having said excessively deviant machine voltage value causes said deviant voltage machine to present a high impedance state, to said transmission bus, whereby said machine in said condition producing no performance causes no loading on said bus.

19. A system for machine control for simultaneously controlling the operation in real time of a plurality of electrically powered machines, comprising:
- a plurality of electrically powered machines; each of said machines including means for receiving, operating and reporting status in response to electrical commands from a computer, said machines not containing stored data to control machine operation;
- a computer having access to stored data for commanding the operation of each of said plurality of machines, said commands outputted in a sequence in accordance with the program of said computer, said commands occurring in cycles of short time duration, each of said cycles including a separate command directed to each of said plurality of machines;
- an electrical bus extending from said computer and transmitting said outputted commands and said status reports;
- coupling means for electrically coupling each of said machines to said bus;
- means at said computer for outputting a first signal command sent via said bus from said computer addressed to one selected powered machine to determine the type and powered condition, on or off, of said addressed machine;
- means at said powered selected machine for outputting a response to said first command sent via said bus from said one selected machine to said computer indicating the type and powered condition of said selected machine;
- means at said computer for outputting a second signal command sent via said bus from said computer addressed to said one selected machine, said one selected machine being powered on, ordering performance of a machine function, data defining said machine function being retrieved from said stored data by said computer for transmission to said addressed machine, said stored data including an inventory of machine functions performable by said plurality of machines;
- means at said computer for outputting a third signal command sent via said bus from said computer addressed to said one selected machine to determine the status of said machine in the performance of said ordered machine function;
- means at said powered selected machine for outputting a response to said third command sent via said bus from said one selected powered machine to said computer indicating the performance status of said addressed machine.

20. The system for machine control of claim 19 wherein said sequence of commands and responses in accordance with said computer programs is followed by another sequence of commands and responses in accordance with said computer program directed to another machine coupled to said bus, the machine function commanded to said other machine being suited to the type and performance capability of said other machine.

21. The system for machine control of claim 19 and further comprising means for excluding said machine function command and response from said sequence of commands and responses in accordace with said computer program, said exclusion to a machine occurring when a prior machine function command to said machine is not yet completely executed, whereby only the status of said machine is outputted to said computer.

22. The system for machine control of claim 19 and further comprising means at said computer for detecting the powered condition of an addressed machine whereby when in accordance with said computer program said means for outputting a first signal command sends a command via said bus from said computer addressed to an unpowered machine to determine the type and powered condition, on or off, of said addressed machine, and no response is received from said unpowered machine, the next operations in said sequence are directed to another machine.

23. The system for machine control of claim 19 further including means at said machines to output a REPLY signal sent from an addressed powered machine via said bus to said computer when said addressed powered machine has accepted a command ordering either performance of a machine function or transmission of machine status data, and means at said computer for detecting said REPLY signal.

24. The system for machine control of claim 19 wherein said sequence of commands and responses is followed by another sequence of commands and responses directed to another machine coupled to said bus, said machine function commanded to said other machine being suited to the type and performance capability of said second machine.

25. The system for machine control of claim 24 wherein each sequence of commands and responses in accordance with said computer program is followed by yet another sequence of commands and responses in accordance with said computer program directed to yet another machine until said computer has commanded and monitored individually each machine coupled to said bus in a predetermined order thereby completing a cycle of operation and said system for machine control further comprising means for timing and control whereby said cycle of operational sequences is fixed in duration and repeats.

26. The system for machine control of claim 25 wherein the period of said cycle of fixed duration exceeds the cumulative time of all commands signals and responses within said cycle, leaving unused time within said cycle; and further comprising peripheral means at said computer for adding to, removing from, and modifying said stored data during said otherwise unused time within said cycle, whereby new or modified tasks are assigned to individual machines and said inventory of stored functions is revised without interrupting operation of other machines active in said machine control system.

27. The system for machine control of claim 25 and further comprising a PARK control at each of said machines, and means at said computer for detecting the condition of said PARK controls whereby by actuation of the PARK control of a selected machine, the sequences of commands cyclically directed to said selected one of said powered machines maintain a single fixed condition on said selected powered machine, whereby said stabilized machine is accessible to the machine operator without hazard of machine actuation.

28. A system for machine control for simultaneously controlling the operation in real time of a plurality of electrically powered machines comprising:
 a plurality of electrically powered machines, each of said machines including means for receiving, comparing and responding to electrical commands from a computer,
 a computer having access to stored data for commanding the operation of each of said plurality of machines, said commands outputted in a sequence in accordance with the program of said computer, said commands including address commands comprising address data and machine function data;
 an electrical bus extending from said computer and transmitting said outputted commands;
 coupling means for electrically coupling each of said machines to said bus;
 transmitter means at said computer for outputting said commands onto said bus, said bus carrying said commands from said computer to said plurality of machines via said bus and said coupling means;
 transmitter means at each of said plurality of machines for outputting data from said machine onto said bus, said data being inputted to said computer via said bus;
 said means at said powered machines for receiving, comparing and responding to commands including:
 comparison means comprising unique address information within each machine, whereby said unique address information is compared to said machine address data received in said computer address command;
 an address latch within a machine, said latch being set and outputting when said address data from said computer matches said unique address information in said comparison means of said machine;
 a second latch within an addressed machine, said second latch retaining and outputting said machine function data from said computer address command;
 decoder means within a machine, the output of said second latch and said output of said address latch jointly actuating said decoder means in said addressed machine to provide a decoder output signal within said addressed machine.

29. The system of machine control of claim 28 further comprising gate means in each of said machines, and wherein said commands from said computer include an IN pulse, said IN pulse is ANDED in said gate means with the output of said address latch, said address latch having been set by said prior address command signal, the output of said gate causing said transmitting means at said addressed machine to turn on and to output a status report of machine condition to said computer via said bus.

30. The system for machine control of claim 27 further comprising:
 AND gate means in said machines, said gate means enabled at one input by said decoder output signal and said AND gate means outputting upon reception at the other input of said AND gate means of a following control signal from said computer; and
 means in said machines for performing machine functions; and
 third latch means in said machines, said third latch means enabled by said one AND gate output, and said third latch means set by concurrent application of said one AND gate output and said following data command signal from said computer, the output from said third latch, when set, causing said means for performing machine functions in said machine addressed by said prior address command from said computer, to perform a machine function.

31. The system for machine control of claim 30 wherein:
 said transmitter means at said computer additionally comprise means for transmitting an OUT pulse, and
 said following data command signal is in binary format, said data signal being accessible from said stored data to said computer; and
 said following control signal is an OUT pulse from said OUT pulse transmitter, said OUT pulse being coincident with said data command.

32. The system for machine control of claim 31 and further comprising a second AND gate, said OUT signal and said output of said address latch being inputted to said second AND gate, the output of said second AND gate being inputted to said one AND gate, whereby only said addressed machine performs in response to said OUT signal.

33. The system for machine control of claim 30 and further comprising second AND gate means, and wherein;
 said computer commands are in parallel binary format;

said unique address information at each machine is contained in a plurality of binary bit switches;
machine type information at each machine is contained in a plurality of binary bit switches;
said address and second latches are set by a SYNC control pulse from said computer via said bus;
the outputs of said address latch and said second latch are inputted to said second gate means, the output of said second AND gate means actuating said decoder means;
whereby a machine function in the one addressed machine, having said unique address, is enabled, and the others of said plurality of machines coupled to said bus are not enabled.

34. The system for machine control of claim 33 wherein said SYNC pulse occurs after said first address command has stabilized on said bus.

* * * * *